United States Patent [19]

Steininger

[11] Patent Number: 5,019,462

[45] Date of Patent: May 28, 1991

[54] SHEET-LIKE, MULTILAYER MAGNETO-OPTICAL RECORDING MATERIAL

[75] Inventor: Helmut Steininger, Worms, Fed. Rep. of Germany

[73] Assignee: BASF Aktiengesellschaft, Ludwigshafen, Fed. Rep. of Germany

[21] Appl. No.: 301,026

[22] Filed: Jan. 24, 1989

[30] Foreign Application Priority Data

Feb. 2, 1988 [DE] Fed. Rep. of Germany ....... 3803000

[51] Int. Cl.$^5$ ............................................. G11B 7/00
[52] U.S. Cl. ................................. 428/694; 428/148; 428/695; 428/701; 428/900
[58] Field of Search ............... 428/694, 900, 336, 148, 428/695, 701; 360/131, 135; 365/122; 369/13, 14

[56] References Cited

U.S. PATENT DOCUMENTS

| | | |
|---|---|---|
| 4,126,494 | 11/1978 | Imamura et al. . |
| 4,152,486 | 5/1979 | Imamura et al. . |
| 4,495,242 | 1/1985 | Arai et al. ............................ 428/900 |
| 4,596,735 | 6/1986 | Noguchi et al. ..................... 428/900 |
| 4,612,068 | 9/1986 | Tanaka et al. . |
| 4,658,388 | 4/1987 | Ishiwatari et al. . |
| 4,661,418 | 4/1987 | Yanai et al. ......................... 428/900 |
| 4,661,420 | 4/1987 | Nakamura et al. . |
| 4,666,759 | 5/1987 | Ohkawa et al. ..................... 428/694 |
| 4,670,353 | 6/1987 | Sakurai . |
| 4,670,356 | 6/1987 | Sato et al. . |
| 4,680,742 | 7/1987 | Yamada et al. . |
| 4,684,454 | 8/1987 | Gardner . |
| 4,693,934 | 9/1987 | Nishimatsu et al. . |
| 4,693,943 | 9/1987 | Kishi et al. . |
| 4,695,510 | 9/1987 | Sawamura et al. . |
| 4,696,862 | 9/1987 | Kawana et al. ..................... 428/900 |
| 4,741,967 | 5/1988 | Yoshihara et al. .................. 428/694 |
| 4,766,034 | 8/1988 | Sato et al. ........................... 428/900 |
| 4,777,068 | 10/1988 | Omato et al. . |
| 4,824,539 | 4/1989 | Komoda et al. ..................... 428/694 |
| 4,855,175 | 8/1989 | Wakai et al. ........................ 428/694 |
| 4,889,767 | 12/1989 | Yokoyama et al. ................. 428/900 |

FOREIGN PATENT DOCUMENTS

| | | |
|---|---|---|
| 0233034 | of 0000 | European Pat. Off. . |
| 0228409 | 1/1987 | European Pat. Off. . |
| 0229292 | 7/1987 | European Pat. Off. . |
| 0231672 | 8/1987 | European Pat. Off. . |
| 0233062 | 8/1987 | European Pat. Off. . |
| 3727093 | of 0000 | Fed. Rep. of Germany . |
| 3335689 | 4/1984 | Fed. Rep. of Germany . |
| 3500314 | 7/1986 | Fed. Rep. of Germany . |
| 3716736 | 12/1988 | Fed. Rep. of Germany . |
| 125949 | 7/1985 | Japan . |
| 125950 | 7/1985 | Japan . |
| 037837 | 2/1988 | Japan . |
| 2175160 | of 0000 | United Kingdom . |
| 2071696 | 9/1981 | United Kingdom . |

OTHER PUBLICATIONS

Patent Abstracts of Japan, vol. 3, No. 122, p. 359 (May 28, 1985), JP-A-607632.

Primary Examiner—Paul J. Thibodeau
Assistant Examiner—Dennis Carmen
Attorney, Agent, or Firm—Keil & Weinkauf

[57] ABSTRACT

A magneto-optical recording element comprises
(A) an optically transparent dimensionally stable substrate and
(B) a thermally alterable recording layer which contains an amorphous lanthanide/transition metal alloy and, at least on the side facing away from the substrate (A), has a 0.1–20 nm thick surface zone containing one or more of the substances carbon, oxygen and nitrogen.

9 Claims, No Drawings

SHEET-LIKE, MULTILAYER MAGNETO-OPTICAL RECORDING MATERIAL

The present invention relates to a novel, sheet-like, multilayer magneto-optical recording material comprising (A) an optically transparent dimensionally stable substrate and (B) a thermally alterable recording layer which is composed of an amorphous lanthanide/transition metal alloy and, at least on the side facing away from the substrate (A), has a surface zone up to 20 nm thick and containing carbon, oxygen and/or nitrogen.

Sheet-like, multilayer magneto-optical recording materials comprising an optically transparent dimensionally stable substrate (A) and a thermally alterable recording layer (B) of an amorphous lanthanide/transition metal alloy are disclosed in, for example, U.S. Pat. Nos. 4,612,068, 4,126,494, 4,152,486, GB-A-2 071 696, U.S. Pat. No. 4,693,934, GB-A-2 175 160, DE-B-3 317 101, U.S. Pat. No. 4,695,510, EP-A-0 233 034, U.S. Pat. Nos. 4,684,454, 4,670,356, 4,670,353, EP-A-0 229 292, EP-A-0 228 409 or U.S. Pat. No. 4,661,420.

These known recording materials are used for recording or writing data with the aid of pulse-modulated laser beams, which are focused on the recording layers (B) and/or strike the said layers at right angles.

During recording or writing of data, an external auxiliary magnetic field is applied to the recording materials, the field lines of the said magnetic field being aligned at right angles to the surface of the recording layers (B) or the recording layers (B) have a correspondingly aligned immanent (intrinsic) magnetic field.

It is known that the recording layers (B) which consist of amorphous ferrimagnetic lanthanide/transition metal alloys and are magnetized at right angles to their surface are heated at the point of contact during writing of the data by means of the laser beam. As a result of heating, the coercive force $H_c$ of the alloys decreases. If the coercive force $H_c$ falls below the field strength of the applied (external) auxiliary magnetic field or of the intrinsic field at a critical temperature dependent on the particular alloy used, an area which has a magnetization direction opposite to the original direction is formed at the point of contact. Such an area is referred to as a spot.

Otherwise, the written data can, if required, be deleted by controlled local heating of the recording layer (B), for example by means of a laser beam, in the presence of an external or intrinsic magnetic field whose field lines are aligned at right angles to the surface of the recording layer (B), after which new data can be written, i.e. the write process is reversible.

The data are read using linearly polarized light of a continuously emitting continuous-wave laser whose light output is insufficient to heat the material above the critical temperature. This laser beam is reflected either by the recording layer (B) itself or by a reflector layer arranged behind it, an interaction taking place between the magnetic moments in the recording layer and the magnetic vector of the laser light wave. As a result of this interaction, the plane of polarization $\vec{E}$ of the laser light which is reflected by a spot or by a reflector layer located behind is rotated through a small angle with respect to the original plane. If this rotation of the plane of polarization $\vec{E}$ takes place during reflection of the light at the recording layer itself, this is referred to as the Kerr effect and the angle of rotation accordingly as the Kerr angle; if, on the other hand, the plane is rotated during passage of the light twice through the recording layer, the terms Faraday effect and Faraday angle are used.

This rotation of the plane of polarization $\vec{E}$ of the laser light reflected by the recording material can be measured and converted into signals with the aid of suitable optical and electronic apparatuses.

If the Faraday effect is utilised in the case of the known recording materials, it is essential for the said materials to contain a reflector layer, since the recording layers (B) as such are transparent to light. Moreover, interference layers must be present to prevent interfering diffraction phenomena.

In the known recording materials under discussion, corrosion protection is of fundamental importance because their recording layers (B) are destroyed extremely rapidly by water and/or atmospheric oxygen, resulting in a total loss of the data written therein. There has therfore been no lack of attempts to protect the recording layers (B) from corrosion.

For example, DE-A-33 35 689 discloses a recording material whose recording layer (B) is from 20 to 100 nm thick. Three further films are present on that side of the recording layer (B) which faces away from the substrate (A), each individual film having a defined function. For example, the first film consists of a material having a high refractive index of 2.0 or more, for example titanium oxide, cerium oxide, antimony oxide, tungsten oxide, silicon oxide, bismuth oxide or cadmium oxide, and serves as an interference film. The second film consists of metals such as copper, silver, chromium, aluminum, rhodium, gold or nickel and constitutes a reflector film. The uppermost film is referred to as an antioxidation film and consists of magnesium oxide, aluminum oxide, silicon oxide, titanium oxide or thorium oxide.

The recording material disclosed in DE-A35 34 571 has a similar structure. Here, the first of the films applied to the recording layer (B) consists of a mixture of silicon carbide and silicon nitride or silicon carbide and aluminum nitride and serves both as a protective film and as an interference film. A suitable second film is a reflective film consisting of a metal such as copper, aluminum or gold. An anticorrosion film may be arranged on top of this. The recording material may contain further auxiliary films, such as an interference film of silicon monoxide, magnesium fluoride, niobium oxide, tantalum oxide, aluminum oxide, aluminum nitride or silicon nitride.

Furthermore, DE-A-35 00 314 discloses a recording material having a film which consists of an oxide/nitride mixture and serves both as an anticorrosion film and as an interference film.

The known combination of an interference film, a reflector film and an antioxidation film, however, cannot be regarded as a single anticorrosion film composed of a plurality of separate strata, because its structure and its composition are not determined exclusively by the anticorrosion effect but mainly by the other functions.

With regard to the anticorrosion effect, the known combination has disadvantages. In particular, its action as an oxygen barrier is unsatisfactory unless it contains, on the air side, a comparatively thick layer of, for example, alumina. Moreover, the choice of the components of the remaining films from other points of view results in disadvantages with regard to the adhesion of the films to one another, the shelf life, the internal stress or the mechanical strength. For example, a known combination which may be optimal with regard to interference and reflection may have a poor anticorrosion effect. Alternatively, its anticorrosion effect may be satisfactory but its shelf life is unsatisfactory. If the components chosen give a particularly hard upper film, the known combination of films together may be so brittle that it fractures under slight mechanical stress. Moreover, inner stresses may produce cracks therein. All this has an adverse effect on anticorrosion action.

It was therefore necessary further to improve the conventional film combinations with regard to their anticorrosion effect through their production, their film structure and/or their composition.

For example, DE-A-35 28 701 discloses a recording material whose recording layer (B) is covered, on its side facing away from the substrate (A), by an anticorrosion film of tungsten carbide, boron carbide, molybdenum carbide, hafnium carbide, niobium carbide, titanium carbide, chromium carbide, vanadium carbide, tantalum carbide or silicon carbide.

U.S. Pat. No. 4,680,742 discloses a recording material whose interference film of silicon nitride between the substrate (A) and the recording layer (B) was improved with regard to the anticorrosion effect too by the addition of yttrium, lanthanum, cerium, titanium, zirconium, chromium, molybdenum, antimony, bismuth, silicon, germanium, tin, lead, aluminum, zinc or cadmium or their oxides, nitrides, sulfides and silicides. These additives are present in the silicon nitride in an amount of from 0.1 to 20, in particular from 4 to 20, mol %.

Furthermore, EP-A-0 233 062 discloses a recording material whose recording layer (B) is covered, on one or both sides, with a protective film or anticorrosion film which essentially consists of a material of three or more covalently bonded components selected from the group consisting of silicon, aluminum, oxygen and nitrogen.

Furthermore, EP-A-0 231 672 discloses a recording material whose recording layer (B) is covered, at least on the side facing away from the substrate (A), with a protective film or anticorrosion film produced by depositing together, from the gas phase, i) La, Ce, Pr, Nd, Pr, Sm, Eu, Gd, Tb, Dy, Ho, Er, Tm, Yb or Lu and ii) $SiO_2$, $Al_2O_3$, CaO, $La_2O_3$, MgO, $Sb_2O_3$, SiO, $SnO_2$, $ZrO_2$, ZnS, CdS, PbS, $SbS_3$, $AlF_3$, $CaF_2$, $CeF_3$, $MgF_2$, $NaAlF_6$, NaF, LiF, $NaF_3$, $PbF_2$, $ThF_4$, AlN, $Si_3N_4$, TiN, TiC, SiC, $Cr_3C_2$, $Mo_2C$ or WC.

In addition, German Patent Application P 37 16 736.7 (O.Z. 0050/39188) describes a 30-250 nm thick anticorrosion film which consists of two or more components present in four or more separate strata, each consisting of one component. Here, one or more of the components are selected from the group consisting of the elements boron, aluminum, silicon, titanium, zirconium, hafnium, vanadium, niobium, tantalum, chromium, molybdenum and tungsten and one or more of the other components are selected from the group consisting of the carbides, nitrides and oxides of these elements. Furthermore, directly adjacent strata always consist of components which differ from one another.

In spite of all these variations in the production process, in the film structure and/or in the composition of the anticorrosion films, it has not been possible reliably and permanently to suppress pinhole corrosion in the recording layers (B). Although, with the aid of the anticorrosion film described in German Patent Application P 37 16 736.7 (O.Z. 0050/39188), it has been possible to make significant progress in the protection of the recording layer (B) from oxygen and water, the higher industrial requirements with regard to recording and playback quality and the life of the recording materials necessitate continuous further development, in particular effectively to suppress the pinhole corrosion in the recording layers (B).

It is an object of the present invention to provide a novel, sheet-like, multi-layer magneto-optical recording material comprising (A) an optically transparent dimensionally stable substrate and (B) a thermally alterable recording layer composed of an amorphous lanthanide/transition metal alloy, which does not have the disadvantages of the prior art.

We have found that this object is achieved by the sheet-like, multilayer magneto-optical recording material defined at the outset, which is referred to below as novel recording material for brevity.

For the purposes of the present invention, the term sheet-like includes all spatial forms whose thickness is substantially smaller than their length and width. The novel recording material can accordingly be tape-like, plate-like or disk-like, the disk-like recording materials, which are generally referred to as disks, being advantageous.

The essential component of the novel recording material is the novel, thermally alterable recording layer (B) which is composed of an amorphous lanthanide/transition metal alloy and is referred to below as novel recording layer (B) for brevity.

Like the conventional magneto-optical recording layers, the novel recording layer (B) consists of an amorphous lanthanide/transition metal alloy and is from 10 to 500 nm thick. As in the known cases, the lanthanides praseodymium, neodymium, samarium, europium, gadolinium, terbium, dysprosium and holmium and the transition metals iron and cobalt are suitable for producing the novel recording layer (B), suitable mixing ratios of lanthanides with transition metals being generally known. Moreover, the amorphous lanthanide/transition metal alloys may contain further elements, such as scandium, yttrium, lanthanum, vanadium, niobium, tantalum, chromium, molybdenum, tungsten, manganese, nickel, rhenium, ruthenium, osmium, rhodium, iridium, palladium, platinum, copper, silver, gold, zinc, boron, aluminum, gallium, indium, silicon, germanium, tin, lead, phosphorus, arsenic, antimony and/or bismuth, in conventional and known amounts.

Examples of suitable lanthanide/transition metal alloys for producing the novel recording layer (B) are $(Nd_{0.25-0.35}Dy_{0.05}Fe_{0.5-0.6}Co_{0.1})_{0.99}(Ti,Cr)_{0.01}$, $Gd_{0.2-0.3}Fe_{0.7-0.8}$, $Gd_{0.2-0.3}Co_{0.7-0.8}$, $Tb_{0.15-0.25}Fe_{0.75-0.85}$, $Gd_{0.15-0.25}Co_{0.75-0.85}$, $Dy_{0.18-0.28}Fe_{0.72-0.82}$, $Gd_{0.13}Tb_{0.13}Fe_{0.74}$, $(Sm_{0.06-0.31}Tb_{0.69-0.94})_{0.15-0.35}Fe_{0.65-0.85}$, $[(Sm_{0.1-0.26}Tb_{0.74-0.9})_{0.6}Gd_{0.4}]_{0.23}Fe_{0.77}$ or $(Tb_{0.25}Fe_{0.75})_{0.92}Pt_{0.08}$.

The novel recording layer (B) possesses, at least on the side facing away from the substrate (A), a surface zone which is up to 20 nm thick and contains carbon, oxygen and/or nitrogen, or else the novel recording layer has, on both sides, a surface zone which is up to 20 nm thick and contains carbon, oxygen and/or nitrogen, the two surface zones of the relevant recording layer (B) being of roughly the same or the same thickness, structure and composition. However, the two surface zones may differ from one another in their thickness, their structure and/or their composition.

Regardless of whether the novel recording layer (B) contains one or two surface zone(s), the thickness of the surface zone(s) is not more than 20 nm, because the particularly advantageous technical effect of the surface zone(s) make greater layer thicknesses unnecessary. On the other hand, the thickness of the surface zone should not be less than 0.1 nm, since otherwise its particular action against pinhole corrosion is no longer completely satisfactory. According to the invention, the thickness of from 0.5 to 20 nm, preferably from 1 to 18 nm, in particular from 2 to 16 nm, is advantageous and therefore an optimal range within which the thickness of the surface zone can be varied and adapted in its structure, its composition and its performance characteristics, in an excellent but simple manner, to the particular lanthanide/transition metal alloy, the total thickness of the recording layer (B) and/or the other films present in the novel recording material.

The surface zone of the novel recording layer (B) contains carbon, oxygen and/or nitrogen, i.e. in addition to the components of the lanthanide/transition metal alloy it contains only carbon, oxygen or nitrogen, or it contains oxygen and nitrogen, oxygen and carbon, carbon and nitrogen or carbon, oxygen and nitrogen. The surface zone can therefore also be regarded as a carbide, oxide, nitride,. oxide/nitride, oxide/carbide, carbide/nitride or carbide/oxide/nitride zone. The combined used of oxygen and nitrogen or oxygen and carbon is advantageous, i.e. surface zones which contain oxygen and nitrogen or oxygen and carbon together are preferred according to the invention.

The carbon, oxygen and/or nitrogen are uniformly distributed in the surface zone of the novel recording layer (B), i.e. the surface zone has no gradients with regard to the carbon, oxygen and/or nitrogen concentration. The surface zone contains a stoichiometric amount of carbon, nitrogen and/or oxygen, i.e. the surface zone is a stoichiometric lanthanide/transition metal oxide, nitride, carbide, oxide/carbide, oxide/nitride, carbide/ nitride or carbide/oxide/nitride zone. Alternatively, the surface zone contains substoichiometric amounts of carbon, oxygen and/or nitrogen, i.e. the surface is an interstitial lanthanide/transition metal oxide, nitride, carbide, oxide/carbide, oxide/nitride, carbide/nitride or carbide/oxide/nitride phase. According to the invention, surface zones which contain substoichiometric amounts of carbon, oxygen and/or nitrogen are advantageous.

However, the carbon, oxygen and/or nitrogen may be non-uniformly distributed in the surface zone, i.e. a carbon, oxygen and/or nitrogen concentration gradient is present in the surface zone.

If the surface zone contains carbon, oxygen or nitrogen, the direct result is that some or all of the surface zone has a substoichiometric composition, or that carbon-free, nitrogen-free and oxygen-free areas or strata are present in the said zone.

If the surface zone contains oxygen and nitrogen, oxygen and carbon, carbon and nitrogen or carbon, oxygen and nitrogen, some or all of the said zone has a substoichiometric composition with regard to one of the concentrations, and the said zone may be of stoichiometric or substoichiometric composition with respect to the particular total concentration.

According to the invention, surface zones which have a substoichiometric composition with respect to the particular individual concentrations and also have a concentration gradient are advantageous.

It is advantageous, according to the invention, if one or more of the individual concentrations decrease from the outer interface of the surface zone to its inner interface, this decrease in the individual concentrations being continuous or discontinuous.

If the oxygen and/or carbon concentration, carbon and/or nitrogen concentration, oxygen and/or nitrogen concentration or carbon, oxygen and/or nitrogen concentration decreases discontinuously within a surface zone, this inevitably leads to the formation of separate strata in the surface zone. These separate strata are strata which differ from one another in their oxygen and/or carbon concentration, carbon and/or nitrogen concentration, oxygen and/or nitrogen concentration or carbon, oxygen and/or nitrogen concentration. Pure lanthanide/transition metal strata may also be present. The separate strata may be separated from one another by a sharp phase boundary or may have a gradual, i.e. fluid, transition zone. In general, however, one or more of the particular individual concentrations decrease from the outer interface of the surface zone to its inner interface.

Regardless of whether the decrease in the particular concentrations is continuous or discontinuous, after the inner interface of the surface zone these concentrations are below the detection limit of the conventional detection methods for carbon, oxygen or nitrogen, i.e. the relevant concentrations are virtually zero.

Also advantageous according to the invention are surface zones which have a substoichiometric composition with respect to all individual concentrations and also have concentration gradients which, however, do not take the form of a discontinuous decrease in the particular individual concentrations but of a discontinuous change in the said concentrations. The individual concentrations initially decrease from the outer interface of the surface zone, then increase and thereafter decrease again. This change may occur once or several times within the surface zone. The change may affect one of the particular individual concentrations, for example the oxygen or nitrogen concentration, or all the particular individual concentrations. In the case of the discontinuous change of the said concentration(s) within the surface zone, the carbon, oxygen and/or nitrogen concentration may fall below the detection limit of conventional detection methods for carbon, oxygen and/or nitrogen, i.e. may be virtually zero. Of course, here as in the cases described above, the carbon, oxygen and/or nitrogen concentration is virtually zero from the inner interface of the surface zone in the novel recording layer (B).

The discontinuous change in the carbon, oxygen and/or nitrogen concentration results in the formation of separate strata in the surface zone.

The change in the carbon, oxygen and/or nitrogen concentration from one stratum to the next may be abrupt, so that the individual strata are separated from one another by a sharp phase boundary. However, the change in the concentration(s) may also be gradual, i.e. fluid.

In both cases, oxygen-containing strata may occur adjacent to oxygen-free ones, the oxygen-free strata being carbon-containing and/or nitrogen-containing strata and/or lanthanide/transition metal strata. The oxygen-containing strata may have a certain, comparatively low carbon and/or nitrogen concentration.

The gradual, i.e. fluid transition from one separate stratum to the next is particularly advantageous according to the invention.

Regardless of which of the types described above the surface zone of the novel recording layer (B) is, and regardless of whether the novel recording layer (B) has two of these surface zones, the novel recording layer (B) has an abrupt transition with the film(s) (C) directly adjacent to it. There is a sharp phase boundary between the outer interface of a surface zone and the film (C) directly adjacent to the said zone. Alternatively, the novel recording layer (B) has a gradual, i.e. fluid, transition with the film(s) (C) directly adjacent to it.

Regardless of whether the novel recording layer (B) has one or two of the surface zones described above, and regardless of whether their outer interface has an abrupt or gradual transition with the film(s) (C) directly adjacent to the said interface, the thickness of the surface zone(s) of a given novel recording layer (B) always depends on the required thickness of the film of pure lanthanide/transition metal alloy present therein, in order to ensure satisfactory magneto-optical writing and reading of data. In general, a 10-500 nm thick film of pure lanthanide/transition metal alloy is sufficient for this purpose. Accordingly, the thickness of the surface zone(s) must be chosen within the abovementioned thickness ranges of from 0.1 to 20 nm, advantageously from 0.5 to 20 nm, preferably from 1 to 18 nm, in particular from 2 to 16 nm, so that, in a predetermined novel recording layer (B), the thickness of the pure alloy film is not less than the minimum thickness of 10 nm required for satisfactory magneto-optical writing and reading of data.

The novel recording layer (B) is produced as part of the production of the novel recording material.

The novel recording material contains, in addition to the novel recording material (B), the optically transparent dimensionally stable substrate (A) as a further essential component.

Advantageous substrates (A) are the conventional, disk-shaped, optically transparent dimensionally stable substrates (A) having a diameter of from 90 to 130 mm and a thickness of 1.2 mm. They generally consist of glass or of plastics, for example polycarbonate, polymethyl methacrylate, polymethylpentene, cellulose acetobutyrate or mixtures of poly(vinylidene fluoride) and polymethyl methacrylate or polystyrene and poly(2,6-dimethylphen1,4-ylene ether). Among these, the substrates (A) of plastic are particularly advantageous.

That surface of the substrate (A) which faces the novel recording layer (B) may have structures.

The structures in the surface of the substrate (A) are in the micrometer and/or submicrometer range. They are used for exact guidance of the read laser beam and ensure a rapid and exact response of the tracking servo and autofocusing means in the laser-optical readwrite heads of the disk drives, i.e. they permit or improve tracking. Moreover, these structures may themselves be data, as is the case, for example, in the known audio or video compact disks, or they can be used for coding the recorded data. The structures consist of raised parts and/or identations. These are in the form of continuous or concentric spiral tracks or isolated hills and/or holes. Furthermore, the structure may have a more or less smooth wave form. The tracks are preferred. They have a rectangular sawtooth-like, V-shaped or trapezoidal contour in their transverse direction. Their indentations are generally referred to as grooves and their raised parts as land. Particularly advantageous parts are those having 50-200 nm deep and 0.4-0.8 $\mu$m wide grooves separated in each case by a 1-3 $\mu$m wide land.

The particularly preferably used substrate (A) is produced in a conventional manner by shaping the plastic or plastic mixture forming the substrate (A) by the injection molding method under clean-room conditions, as described, for example, in German Patent Application P 37 27 093.1 [O.Z. 0050/39384].

The novel recording material may contain, in addition to the substrate (A) and the novel recording layer (B), one or more further films (C).

For example, a conventional and known interference film (C) of an optically transparent material having a high refractive index may be present between the substrate (A) and the novel recording layer (B). This material usually contains or consists of oxides and/or nitrides.

Furthermore, a conventional and known reflector film (D), which usually consists of metals, may be present on that side of the novel recording layer (B) which faces away from the substrate (A).

In addition, a further, optically transparent film (C) containing or consisting of oxides and/or nitrides may be present between the novel recording layer (B) and the reflector film (D).

Moreover, the novel recording material may possess, on that side of the reflector film (D) which faces away from the novel recording layer (B), a conventional and known protective or anticorrosion film (C), which likewise contains or consists of carbides, oxides and/or nitrides.

The additional films (C) and (D) may also be composed of a plurality of separate strata. Furthermore, the films (C) may be X-ray amorphous or polycrystalline.

The thickness of these additional films (C) and (D) is generally known and can be obtained, for example, from the prior art cited at the outset.

For specific intended uses, the novel recording material may also have one or more other, conventional and known magnetizable layers. These magnetizable layers can be magnetically hard or magnetically soft layers or a conventional and known magneto-optical recording layer. The novel recording layer (B) is also suitable for this purpose.

These additional films (C) and (D) and the further magnetizable layers are produced as part of the production of the novel recording material, the order of the individual production or process steps arising inevitably from the particular structure of the novel recording material.

Two of the novel recording materials described above may furthermore be combined with one another in a sandwich-like manner so that their recording layers (B) face one another and there is a certain distance between them. The conventional and known techniques for connecting two recording materials are used for this purpose.

The novel recording material is produced using the substrate (A) described above, on one surface of which the novel recording layer (B) is applied in the desired thickness and with the particular internal composition required according to the invention, and, if required, the films (C) and (D) and the further magnetizable layers, in the desired order, number and thickness and with the particular composition desired, from the gas phase, after which a defined magnetization oriented vertically with respect to its surface is induced in a conventional manner in the novel recording layer (B).

The novel recording layer (B) and any further films present are applied by the conventional techniques for the production of thin films by vapor deposition, reactive vapor deposition, ion-plating, ion cluster beam deposition (ICB), sputtering, reactive sputtering, magnetron sputtering or reactive magnetron sputtering, the sputtering method preferably being used.

In the sputtering process, the appropriate metals, carbides, oxides, nitrides and/or any other compounds used are sputtered under reduced pressure in the desired sequence and quantity from a target and deposited on the substrate (A) or on a layer already present thereon. The process gas usually contains a noble gas, such as argon.

In reactive sputtering, further reactive gases, such as hydrogen, hydrocarbons, oxygen, nitrogen, etc., are mixed with the process gas in the desired amount at a suitable time. As a result, the relevant metal oxide, nitride carbide, carbide oxide, carbide nitride, oxide nitride or carbide oxide nitride film can be deposited directly by sputtering a metal, for example in the presence of hydrocarbons, oxygen and/or nitrogen in the process gas. It is known that the thickness, the structure and the composition of the relevant layer can be extremely precisely and very reproducibly obtained via the sputtering rate, the deposition rate, the process gas pressure and the process gas composition.

In (reactive) magnetron sputtering, the target is present in a magnetic field.

The novel recording layer (B) is advantageously prepared by means of (magnetron) sputtering, the surface zone which is up to 20 nm thick and contains carbon, oxygen and/or nitrogen being produced during the production of the novel recording layer (B), at least on the side facing away from its substrate (A). Alternatively, this surface zone is produced after application of the pure lanthanide/transition metal alloy film, by partial or complete reaction of a surface zone up to 20 nm thick with carbon, oxygen and/or nitrogen.

Production of the surface zone during the production of the novel recording layer (B) is very particularly advantageous because, in this case, the relevant surface zone can be produced in an elegant manner by reactive (magnetron) sputtering of the lanthanide/transition metal alloy in any case used, in the presence of hydrocarbons, oxygen and/or nitrogen. The process parameters can be adjusted in a conventional and known manner and/or determined by simple preliminary experiments, so that transition zones of the type described above results.

If the novel recording layer (B) is to have a 20 nm thick surface zone containing carbides, oxides and/or nitrides also in its side which faces the substrate (A), this surface zone is produced either by (i) applying a film up to 20 nm thick and consisting of the relevant lanthanide/transition metal alloy, in the presence of hydrocarbons, oxygen and/or nitrogen, or by (ii) applying a film which is up to 20 nm thick and consists of the relevant lanthanide/transition metal alloy and subsequently partially or completely reacting the said film with carbon, oxygen and/or nitrogen, after which the pure lanthanide/transition metal alloy is deposited in the particular thickness desired.

Application of the surface zone by process step (i) is particularly advantageous, the use of reactive (magnetron) sputtering being very particularly advantageous.

Examples of particularly advantageous sequences of process steps, which in the end lead to novel recording materials having different compositions, i.e. examples of particularly advantageous production processes, are the variants (I) to (IV), starting in each case from the surface of the substrate (A): Variant (I):

(I-1) Film (C) by reactive (magnetron) sputtering,
(I-2) Novel recording layer (B) by (magnetron) sputtering, surface zone by reactive (magnetron)
(I-3) Film (C) by reactive (magnetron) sputtering.

Variant II:
(II-1) Film (C) as for Variant (I),
(II-2) Novel recording layer (B) as for Variant (I),
(II-3) Film (C) as for Variant (I),
(II-4) Reflector film (D) by (magnetron) sputtering,
(II-5) Film (C) as for Variant (I).

Variant (III):
(III-1) First surface zone of the novel recording layer (B) by reactive (magnetron) sputtering, pure lanthanide/transition metal alloy film by (magnetron) sputtering, second surface zone of the novel recording layer (B) by reactive (magnetron) sputtering,
(III-2) Film (C) as for Variant (I).

Variant (IV):
(IV-1) Film (C) as for Variant (I),
(IV-2) Novel recording layer (B) as for Variant (III),
(IV-3) Film (C) as for Variant (I),
(IV-4) Reflector film (D) as for Variant (II),
(IV-5) Film (C) as for Variant (I).

Data in the form of magnetically reversed spots can be written on the novel recording materials in the conventional manner from the side of the optically transparent dimensionally stable substrate (A), with the aid of a pulse-modulated write laser beam which is focused on the novel recording layers (B) and/or strikes these layers at right angles and which has a wavelength $\lambda$ of less than 1,000 nm. Thereafter, the data can be read with the aid of a continuous-wave laser beam which is focused on the recording layers (B) containing recorded data and/or which strikes the said layers at right angles, the light reflected by the recording layers (B) themselves or by the reflector films (D) being collected, analyzed and converted to signals. In the case of the novel disks, the conventional and known laser-optical disk drives having laser-optical heads which contain semiconductor lasers can be used for this purpose.

The novel recording materials have particular advantages over the prior art. For example, they have greater sensitivity than known recording materials and can therefore be written on using lower laser power. Novel magneto-optical disks can therefore be written on at higher disk speeds than known disks, using the same laser power. Furthermore, their bit density is substantially higher compared with the prior art. During reading, they give undistorted signals and have a signal/noise ratio of more than 55 dB. Even after a storage time of more than 1,000 hours at 70° C. and at a relative humidity of 90%, there is no increase in the bit error rate, i.e. there is no loss of information.

The novel recording materials contain the novel recording layer (B). The said layer can be adapted to the property profile of the other films present in the novel recording materials in an excellent but simple manner, with the result that magneto-optical recording materials can be optimized in ways which were hitherto unknown and/or hitherto thought impossible. In particular, the novel recording layer (B) can be very outstandingly anchored in the surface of the substrate (A) and/or in the surface of a film (C) containing carbides, oxides and/or nitrides, so that, even after long-term use, no separation of the relevant films takes place. In particular, however, the novel recording layer (B) is substantially more stable to pinhole corrosion than are the magneto-optical recording layers of the prior art.

EXAMPLES 1 TO 4

Production and performance characteristics of novel magneto-optical disks

Eight 1.2 mm thick polycarbonate disks having a diameter of 130 mm and provided with tracks were produced by injection molding under clean-room conditions, as substrate (A).

Thereafter, while the polycarbonate disks (A) were rotated (4 disks, Examples 1 to 4) their side provided with tracks was coated, in the case of Examples 1 and 2 in accordance with Variant I, with:

(I-1) a film (C) containing oxides and/or nitrides by reactive (magnetron) sputtering, (I-2) the novel recording layer (B) by
  (i) applying a lanthanide/transition metal alloy layer by magnetron sputtering and by
  (ii) producing a surface zone by reactive magnetron sputtering of the lanthanide/transition metal alloy in the presence of carbon, oxygen and/or nitrogen, and (I-3) a further film (C) by reactive magnetron sputtering, and in the case of Examples 3 and 4 in accordance with the Variant II, with:

(II-1) a film (C) according to Variant I (Examples 1 and 2), (II-2) the novel recording layer (B) according to Variant I (Examples 1 and 2), (II-3) a further film (C) according to Variant I (Examples 1 and 2), (II-4) a reflector film (D) by magnetron sputtering and (II-5) a third film (C) according to Variant I (Examples 1 and 2).

In these procedures, the process parameters were chosen so that the composition of the novel disks 1 to 4 stated in Table 1 was obtained (Examples 1 to 4).

To check the success of the process, and for analytical processes, a further four magneto-optical disks were produced under exactly comparable conditions in each case (Examples 1a to 4a). These disks were used to investigate the structure and the composition of the novel recording layers (B), the methods used being conventional, partly material-degrading, analytical methods, such as elemental chemical analysis, optical microscopy, scanning electron microscopy, X-ray spectroscopy, X-ray scattering or diffraction, ESCA (electron spectroscopy for chemical analysis) and flame photometry. Furthermore, conventional nondestructive optical and spectroscopic methods were used to verify that the particular pairs of novel disks (Examples 1, 1a to 4, 4a) were identical to one another, so that the results determined using disks 1a to 4a could also be included in Table 1.

The novel recording layers (B) of the novel disks of Examples 1 to 4 were magnetized at right angles to the layer surface immediately after their production.

The disks were then conditioned for 48 hours at $23\pm2°$ C. under an air pressure of $103\pm3.5$ kPa and at a relative humidity of 45 to 55%.

Data were then recorded on the conditioned disks with the aid of a conventional disk drive under exactly comparable conditions. A pulse-modulated GaAlAs semiconductor laser which emitted linearly polarized light of wavelength $\lambda=830$ nm was used for this purpose. Both the bit length, i.e. the diameter of the magnetically reversed spots, and the bit spacing, i.e. the spacing from spot to spot, were about 1 $\mu$m.

To read the recorded data via the Kerr effect (Examples 1 and 2) or via the Faraday effect (Examples 3 and 4), the GaAlAs semiconductor laser was used in continuous-wave operation, with a light power of less than 1 mW. The uncorrected bit error rate was determined in a conventional manner using a time interval analyzer (TIA). The disks were first read directly after recording (first read operation). Thereafter, the disks were subjected to the accelerated life test typical for magneto-optical recording materials, at 60, 70 and 80° C. and at a relative humidity of 90%, and were then read again (second read operation). From the uncorrected bit error rates obtained in this procedure and from the evaluation of the recording layers (B) of the disks by optical and scanning electron microscopy, their life under normal conditions (30° C., 90% relative humidity) was estimated. The relevant results are shown in Table 2.

COMPARATIVE EXPERIMENTS V1 AND V2

Production and performance characteristics of known recording materials

Two disks which were identical in structure and composition to the samples A-2 and B-5 disclosed in DE-A33 35 689 were produced by the method stated in Examples 1 to 4. The structure of the comparative disks is compared with the structure of the novel disks in Table 1.

The known disks were magnetized, provided with recorded data, read and tested as stated in Examples 1 to 4. The experimental results obtained are compared with the values from Examples 1 to 4, in Table 2.

The comparison shows that the recording materials of known composition were superior to the novel recording materials with respect to the shelf life, which was evident from the substantially increased bit error rate of the known recording materials. Moreover, the known recording materials exhibited pinhole corrosion, in contrast to the novel ones.

TABLE 1

Structure and composition of novel and conventional magneto-optical disks

| Example | First film (C) (nm) | Recording Alloy and total thickness (nm) | Layer (B) Surface zone: Thickness (nm) | Composition mol % C | Composition mol % O | Composition mol % N | Structure | Second film (C) (nm) | Reflector film (D) (nm) | Third film (C) (nm) |
|---|---|---|---|---|---|---|---|---|---|---|
| 1 | SiO (80) | TbDyFe (80) | (15) | 1 | 0.25 | 11 | Uniform C/O/N distribution; sharp transition to film (C) | AlN Al$_2$O$_3$ Si$_3$N$_4$ (20) (20) (20) | — | — |
| 2 | SiO (80) | TbDyFe (90) | (18) | 1 | 3 | 12 | Nonuniform C/O/N distribution: one N-contrining stratum, one O-containing stratum, one C- and one N-containing stratum, each 6 nm thick; fluid transition to film (C) | AlN Al$_2$O$_3$ (40) (20) | — | — |
| 3 | SiO (80) | TbDyFe (25) | (3) | 0 | 1 | 10 | Nonuniform O/N distribution: O/N content decreases continuously from the outer interface; fluid transition to film (C) | Si$_3$N$_4$ (100) | Al (300) | Si$_3$N$_4$/SiO (100) |
| 4 | SiO (80) | TbDyFe (20) | (2.5) | 0 | 1.3 | 9 | Uniform O/N distribution; sharp transition to film (C) | TiO$_2$ (300) | Al (500) | Ta$_2$O$_5$ (300) |
| Comparative Experiments | | | | | | | | | | |
| V1 | SiO (80) | TbDyFe (60) | — | — | — | — | | TiO$_2$ (200) | — | Al$_2$O$_3$ (300) |
| V2 | SiO (80) | TbDyFe (25) | — | — | — | — | | CeO$_2$ (100) | Al (500) | CrN (300) |

TABLE 2

Experimental results

| Example | Bit error rate (uncorrected) 1st read | Bit error rate (uncorrected) 2nd read | Life (estimated) (Years) | Does pinhole corrosion[a] occur in the accelerated life test? |
|---|---|---|---|---|
| 1 | $<10^{-5}$ | $<10^{-5}$ | >15 | No |
| 2 | $<10^{-5}$ | $<10^{-5}$ | >15 | No |
| 3 | $10^{-5}$ | $10^{-5}$ | 15 | No |
| 4 | $10^{-5}$ | $10^{-5}$ | >15 | No |
| Comp. Exp. | | | | |
| V1 | $10^{-5}$ | $2.10^{-4}$ | 10-11 | Yes |
| V2 | $10^{-5}$ | $6.10^{-4}$ | 10-11 | Yes |

[a]Method of investigation: optical microscopy and scanning electron microscopy

I claim:

1. A magneto-optical recording element comprising:
(A) an optically transparent dimensionally stable substrate and
(B) a thermally alterable recording layer which contains an amorphous lanthanide/transition metal alloy and, at least on the side facing away from the substrate (A) has a 0.1–20 nm thick surface zone with an outer interface and an inner interface and which contains one or more of the substances carbon, oxygen and nitrogen wherein the concentration of one or more of said substances in the surface zone initially decreases then increases and thereafter decreases, from its outer interface to its inner interface, this occurring once or repeatedly, so that separate strata result.

2. A magneto-optical recording element as claimed in claim 1, wherein the concentration of one or more of the substances carbon, oxygen and nitrogen changes abruptly with formation of separate strata which are separated from one another by a sharp phase boundary.

3. A magneto-optical recording element as claimed in claim 1, wherein the concentration of one or more of the substances carbon, oxygen and nitrogen changes gradually, with formation of separate strata.

4. A magneto-optical recording element as claimed in claim 1, wherein the surface zone contains separate oxygen-containing strata in addition to separate oxygen-free strata.

5. A magneto-optical recording element as claimed in claim 4, wherein the oxygen-free strata are strata which are selected from the group consisting of the carbon-containing and nitrogen-containing strata and the lanthanide/transition metal strata.

6. A magneto-optical recording element as claimed in claim 1 wherein the recording layer (B) has (i) a 0.1–20 nm thick surface zone which contains one or more of the substances carbon, oxygen and nitrogen on the side facing away from the substrate and (ii) a 0.1–20 nm thick surface zone which contains one or more of the substances carbon, oxygen and nitrogen on the side facing the substrate, and wherein the concentration of one or more of said substances in one or both of said zones initially decrease then increase and thereafter decrease, from their outer interfaces to their inner interfaces, this occurring once or repeatedly, so that separate strata result.

7. A magneto-optical recording element as claimed in claim 6, wherein, in one or both of the 0.1–20 nm thick surface zones, the concentration of one or more of the substances carbon, oxygen and nitrogen changes abruptly with formation of separate strata, which are separated from one another by a sharp phase boundary.

8. A magneto-optical recording element as claimed in claim 6, wherein, in one or both of the two 0.1–20 nm thick surface zones, the concentration of one or more of the substances carbon, oxygen and nitrogen changes gradually, with formation of separate strata.

9. A magneto-optical recording element as claimed in claim 6, wherein, in one or both of the two 0.1–20 nm thick surface zones contain separate oxygen-containing strata in addition to separate oxygen-free strata.

* * * * *